Aug. 31, 1948.  R. F. WILD  2,448,065
ELECTRICAL HARMONIC REBALANCING APPARATUS
Filed April 25, 1944  4 Sheets-Sheet 1

FIG. 1

INVENTOR.
RUDOLF F. WILD
BY
ATTORNEY.

Aug. 31, 1948.                   R. F. WILD                   2,448,065
                ELECTRICAL HARMONIC REBALANCING APPARATUS
Filed April 25, 1944                                    4 Sheets-Sheet 2

INVENTOR.
RUDOLF F. WILD
BY
*B. Spangenberg*
ATTORNEY.

Aug. 31, 1948.　　　　　R. F. WILD　　　　　2,448,065
ELECTRICAL HARMONIC REBALANCING APPARATUS
Filed April 25, 1944　　　　　　　　　　4 Sheets-Sheet 3

INVENTOR.
RUDOLF F. WILD

Aug. 31, 1948.    R. F. WILD    2,448,065
ELECTRICAL HARMONIC REBALANCING APPARATUS
Filed April 25, 1944    4 Sheets-Sheet 4

*INVENTOR.*
RUDOLF F. WILD
BY
*ATTORNEY.*

Patented Aug. 31, 1948

2,448,065

UNITED STATES PATENT OFFICE 2,448,065

ELECTRICAL HARMONIC REBALANCING APPARATUS

Rudolf F. Wild, Philadelphia County, Pa., assignor to The Brown Instrument Company, Philadelphia, Pa., a corporation of Pennsylvania Application April 25, 1944, Serial No. 532,692

26 Claims. (Cl. 171—95)

The present invention relates to the art of accurately measuring minute electrical currents or potentials.

A general object of the invention is to provide an improved method of and apparatus for eliminating the objectionable effects of stray fluctuating electrical fields or currents upon the operation of apparatus designed to accurately measure the magnitude and changes in magnitude of minute electrical currents or potentials.

A more specific object of the invention is to provide an improved method of and apparatus for eliminating the objectionable effects of extraneously introduced alternating currents upon the operation of measuring apparatus employed to make accurate measurements of minute unidirectional currents or potentials in low resistance circuits.

A further and more specific object of the invention is to provide an improved measuring and/or controlling instrument of the self-balancing type which may follow the approved practices of the art in respect to many of its features, such as adjustment of the exhibiting and rebalancing elements by continuously operable rotatable motor means, and which incorporates suitable means to eliminate or at least appreciably minimize, the disturbing effects of stray electrical fields upon the operation of the motor means and thereby upon the measuring and/or controlling function obtained.

Another object of the invention is to provide an improved method of and apparatus for controlling the energization of a reversible electrical motor for rotation in one direction or the other accordingly as a regularly fluctuating control voltage is of one phase or of opposite phase and having the desirable characteristic of being unaffected by the presence of extraneous fluctuating currents which may be superimposed upon the control voltage even though the extraneous currents are of the same fundamental frequency as the control voltage or contain other frequency components which have proven troublesome in the prior art arrangements.

A serious problem in the measurement of minute electrical currents or potentials whether fluctuating or steady in character, and particularly in the measurement of minute unidirectional current or potential variations in low resistance circuits, is the difficulty of electrically amplifying such current or potential variations with the high degree of fidelity and freedom from extraneous disturbing influences which are required for precision measurements. Electronic amplifying arrangements have been proposed in the prior art which are capable of amplifying minute alternating or pulsating voltages, but the practical application of such amplifiers has been seriously limited by the disturbing and loading effects of stray fluctuating electrical currents which are unavoidably superimposed upon the minute alternating or pulsating current or voltage under measurement. Such extraneous currents cause false balance points of the self-balancing measuring instruments and also cause erratic and unstable operation thereof, and are especially troublesome when they are of the same frequency as the fundamental frequency of the alternating or pulsating current or potential under measurement. This is a condition often encountered in practice since a principal source of stray interfering electrical currents which have a disturbing effect upon the operation of the measuring apparatus is the power mains which supply alternating electrical current to the apparatus and from which the alternating or pulsating current or potential under measurement ordinarily is derived.

In the amplification of minute unidirectional electric current or potential variations in low resistance circuits some means must be provided for translating those current or potential variations into alternating or pulsating currents or potentials which are capable of being amplified by the available electronic amplifiers and for distinguishing between such derived alternating or pulsating current or potential variations and stray interfering currents or potentials which may be superimposed thereon. It is noted that in the present state of development of electronic amplifying equipment, conversion of the minute unidirectional current or potential under measurement into an alternating or pulsating current or potential is necessary in order to accomplish the amplification of minute unidirectional potential or current variations in low resistance circuits because changes in the relative spacing of the electrodes of electronic amplifying tubes and small variations in the amplifier energizing voltages produce current changes in the output circuits of the amplifiers which are similar to and are of the same order of magnitude as the unidirectional potential or current variations under measurement, thus precluding the direct amplification of such variations.

The present invention was specifically devised for the purpose of providing an improved method of and apparatus for overcoming the aforementioned difficulties and relies for its operation upon a characteristic of the wave form of the energizing current supplied the measuring apparatus from the power mains, namely that the fundamental frequency component is by far predominant although some harmonic frequency components may also be present. That is to say, the amplitudes of the harmonic frequency components are relatively small in comparison to the amplitude of the fundamental frequency component. For example, the third harmonic frequency component of the ordinary 60 cycle commercial current source is rarely, if ever, greater than 5% of the fundamental 60 cycle component.

Advantage is taken of this characteristic in the measurement of minute unidirectional potentials or currents, for example, by providing a suitable conversion arrangement to derive from the unidirectional potentials or currents a square wave alternating voltage having a third harmonic of appreciable amplitude. When the square wave alternating voltage so derived is a perfect square wave, the third harmonic frequency component will be of appreciable magnitude, approaching a value which is approximately 40% of the amplitude of the fundamental frequency component of the square wave. This square wave voltage is impressed on the input terminals of an electronic amplifier and the output terminals of the amplifier are connected to the input terminals of a motor drive stage arranged to effect selective energization of a reversible electrical motor for rotation in one direction or the other accordingly as the third harmonic frequency component of said square wave voltage is of one phase or of opposite phase. To this end a suitable filter is operatively connected to the electronic amplifier to attenuate all of the frequency components of the square wave alternating voltage being amplified except the third harmonic frequency component and to permit only the latter to be applied to the motor drive stage for selectively controlling the direction of motor rotation. The filter may desirably comprise a frequency selective feedback network connected between the output and input terminals of the amplifier whereby such attenuation may be accomplished efficiently, and in addition, the loading effect of the attenuated components upon the amplifier may be materially reduced.

Any stray electrical currents or potentials which may be superimposed upon the controlling square wave alternating voltage will also be impressed on the input terminals of the electronic amplifier, but due to the action of the filter, all of the stray frequency components will be attenuated and excluded from the input circuit of the motor drive stage except those corresponding to the third harmonic frequency component of the controlling voltage. When the stray electrical current or potential has no component of the same frequency as that of the third harmonic of the controlling voltage, the objectionable effects of the stray currents or potentials upon the operation of the reversible motor will be entirely eliminated.

Stray potentials or currents having the same frequency as the third harmonic frequency component of the controlling voltage will, of course, pass through the filter and tend to adversely affect the energization of the reversible motor for rotation. The principal source of such a stray frequency component, as has previously been noted, is the third harmonic frequency component of the energizing current supplied to the amplifier and motor from the power mains, which third harmonic component, is rarely, if ever, larger than 5% of the fundamental stray component. On the other hand, the third harmonic component of the controlling voltage has an amplitude of approximately 40% that of the fundamental component of the controlling voltage. Inasmuch as the amplitude of the controlling current or voltage component passed through the filter has been reduced only to 40%, while the stray current or voltage component has been reduced to a maximum of 5%, an increase in "signal-to-noise" ratio of at least eight times is obtained by means of the present invention, even under the most adverse operating conditions.

It will be apparent to those skilled in the art that my invention is not limited in its application to incorporation in apparatus for making precise measurements of unidirectional potential or current variations but may also be employed to advantage in making measurements of minute alternating or pulsating currents or voltages having a third harmonic frequency component of relatively large amplitude, and furthermore, may also be advantageously employed in remote control or positioning systems wherein it is desired to selectively energize a reversible electrical motor for rotation in one direction or the other in response to reversal in phase of a small alternating or pulsating current or voltage having a third harmonic frequency component of appreciable amplitude.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
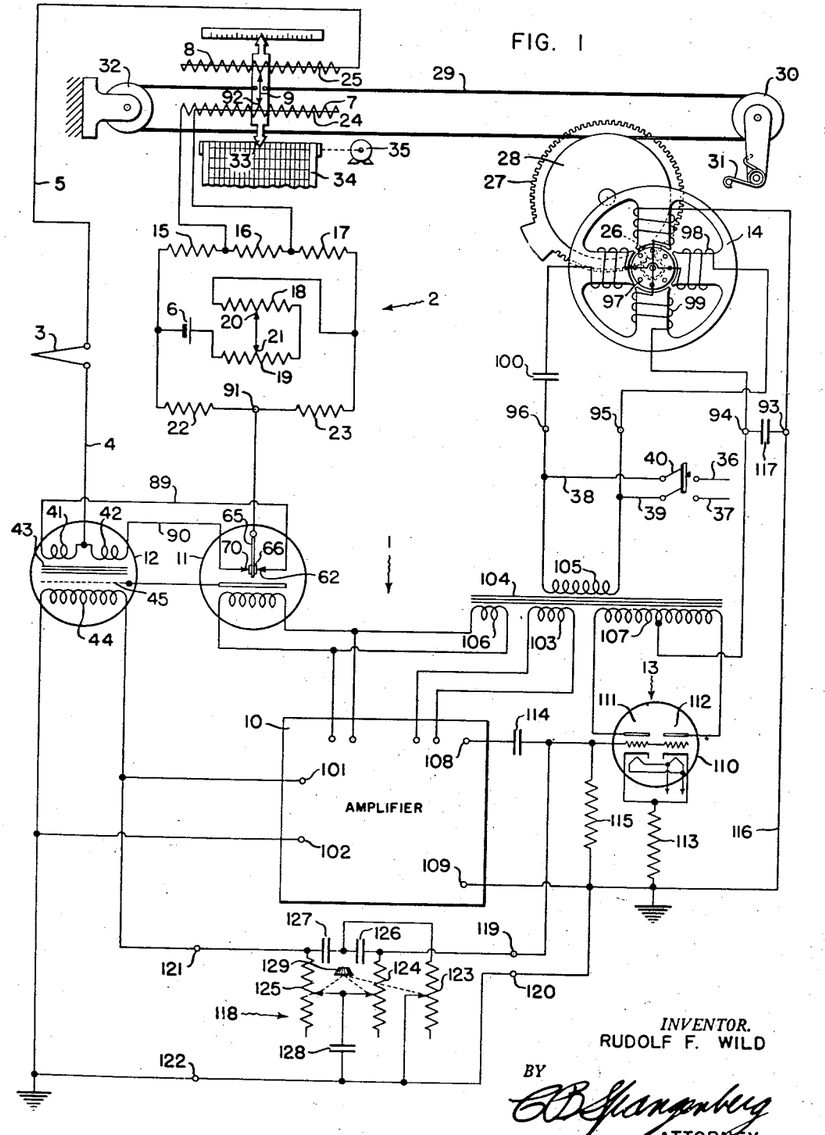
Fig. 1 is a diagrammatic representation of the use of my invention in a self-balancing potentiometric recording system.

In Fig. 1 there is illustrated in schematic form an arrangement including an electronic motor drive system 1 for producing effects in accordance with the extent of unbalance of a potentiometric network 2 which controls the electronic amplifier and is unbalanced in accordance with the variations in a minute unidirectional electromotive force to be measured, namely, that produced by a thermocouple 3 and in which because of the small magnitude of the thermocouple electromotive force it is not desirable, nor possible, to have the said effects produced directly by the thermocouple electromotive force.

More specifically, an arrangement is illustrated in Fig. 1 for measuring and visually exhibiting the temperature of a furnace, not shown, to which the thermocouple 3 is responsive. The thermocouple 3 usually is located at a position remote from the remainder of the measuring apparatus and has its terminals connected by conductors 4 and 5 to the terminals of the potentiometric measuring network 2 which may be of any suitable type such as the Brown potentiometer network disclosed in the Harrison et al. Patent 2,150,502 issued on March 14, 1939.

The potentiometric measuring network 2 is of a well-known type, and it is believed to be sufficient for the present purposes to note that the potentiometric measuring network includes a circuit branch in which the thermocouple 3 is connected and an opposing branch including a source of known potential such as a battery 6 and resistors 7 and 8, a variable portion of which may be connected to the opposed branches in accordance with the adjustment of a sliding contact 9 whereby the respective effects of the variable and known sources are made equal and opposite and the potentiometric measuring network is balanced for a given value of the electromotive force of the thermocouple 3 with the contact 9 in a corresponding position along the length of resistances 7 and 8. The position of contact 9 thus provides a measure of the value of the thermocouple electromotive force and may serve as a measure of the temperature to which the thermocouple is opposed.

Upon change in the temperature to which the thermocouple is subjected, an unbalanced unidirectional potential of one polarity or of the opposite polarity is produced in the potentiometric measuring network 2 depending upon the sense of unbalance of the potentiometric measuring network 2, and consequently, upon the direction of the temperature change. The unbalanced direct current potential so produced is impressed on the input circuit of the electronic motor drive system 1 which, as shown, includes an electronic amplifier 10, a vibrator 11, an input transformer 12, and a motor drive stage 13.

The unidirectional potential applied to the input circuit of the motor drive system 1 is translated by the vibrator 11 into a pulsating current having one polarity or the opposite polarity depending upon the sense of unbalance of the potentiometric network. This pulsating current is converted into a type of square wave alternating current which is impressed on and amplified by the transformer 12 and is further amplified by the electronic amplifier 10. The amplified quantity produced at the output terminals of the amplifier 10 is impressed on the input terminals of the motor drive stage 13 and operates to control the operation of the latter as is required to effect selective energization of a reversible electrical motor 14 for rotation in one direction or the other. The motor 14 is employed to operate a slidewire assembly to rebalance the potentiometric network 2 and also serves to adjust an indicating and recording mechanism which is described hereinafter.

The potentiometric measuring network 2 includes three resistances 15, 16 and 17 connected in one branch. These resistances are formed of material having a substantially zero temperature coefficient of resistance and are employed for calibration purposes. The battery 6 which may conveniently take the form of a dry cell and a dual vernier rheostat comprising resistances 18 and 19 and electrically connected sliding contacts 20 and 21 which engage the resistances 18 and 19, respectively, are connected in series in a branch parallel to the branch including resistances 15, 16 and 17. The rheostat may be operated by any suitable type of knob, not shown, which desirably has a direct mechanical connection with the contact 20 and a lost motion connection with the contact 21. Upon initial movement of the knob the contact 20 is first moved and then contact 21 is moved thereby providing a vernier adjustment. To this end, the resistance 19 is preferably of higher value than the resistance 18.

Also connected in parallel with the resistances 15, 16 and 17 is a third branch including two series connected resistances 22 and 23. The resistance 22 is preferably made of nickel, copper or other material having a positive temperature coefficient of resistance and the resistance 23 is made of manganin having a substantially zero temperature coefficient of resistance. The resistance 22 in conjunction with the resistance 23 operates to compensate for changes in the ambient temperature to which the cold or reference junction of the thermocouple 3 is subjected. The resistance 23 is also provided for standardization purposes and has a value such that the potential drop across it is of the same magnitude as the potential produced by a standard cell, not shown, but which may be periodically connected to the potentiometric network 2 for standardizing the latter in the manner disclosed, for example, in application Serial No. 421,173, filed on December 1, 1941, by Walter P. Wills, which issued as Patent No. 2,423,540 on July 8, 1947.

The slidewire assembly of the potentiometric measuring network 2 consists of the resistances 7 and 8 and the contact 9. The resistance 7 comprises a coil which is wound around and is insulated from a core 24. Cooperating with the slidewire 7 is the resistance 8 which constitutes a collector bar and comprises a coil wound around a core 25. The slidewire 7 and collector bar 8 are electrically connected by the sliding contact 9 which is adjusted along the length of the slidewire 7 and collector bar 8 by the reversible motor 14 as is required to maintain the potentiometric measuring network 2 balanced. The terminals of the slidewire 7 and its core 24 are connected in parallel to the resistance 16.

The shaft of motor 14 drives a pinion 26 which engages a gear 27. Attached to and movable with the gear 27 is a pulley 28 around which is wound an endless cable 29. The cable 29 is connected to the potentiometric rebalancing contact 9 so that when the motor 14 rotates, the contact 9 will be moved in one direction or the other to rebalance the potentiometric measuring network. One end of the cable 29 runs over a pulley 30 which is pivotally mounted and biased by a spring 31 to take up the slack in the cable. The other end of the cable runs around a stationary pulley 32.

A pen 33 is mounted on the carriage which carries the potentiometer rebalancing contact 9 and is arranged in cooperative relation with a recorder chart 34 to thereby provide a continuous record of the adjustments of the rebalancing contact 9 which are required to maintain the potentiometric measuring network 2 balanced, and accordingly, to provide a record of the variations in magnitude of the unknown potential produced by the thermocouple 3. The chart 34 may be a strip chart as shown and is arranged to be driven in any convenient manner, as for example, by a unidirectional motor 35 through suitable gearing, not shown, so that a record of the variations on the unknown potential will be recorded as a continuous line on the chart 34.

The electronic motor drive system 1 is connected to and receives energizing current from alternating current supply mains 36 and 37 through a pair of conductors 38 and 39. A double pole-single throw switch 40 is provided between the motor drive system 1 and the supply mains 36 and 37 for disconnecting the motor drive system from the supply mains when it is so desired. Preferably, the switch 40 is so located that when it is adjusted to the position to deenergize the system 1 it also deenergizes the chart driving motor 35.

One input terminal of the electronic motor drive system 1 comprises the point of engagement of a pair of primary windings 41 and 42 provided on the input transformer 12. This input terminal is that to which one terminal of the thermocouple 3 is connected by the conductor 4. The primary windings 41 and 42 of the transformer 12 are wound around a core structure 43 on which is also wound a secondary winding 44. A shield 45 is provided between the primary windings 41 and 42 and the secondary winding 44. The windings 41, 42 and 44 and the core structure 43 and shield 45 are all housed in a suitable metallic casing.

Figure 2:
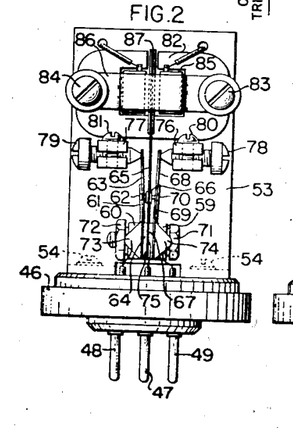
Figs. 2 and 3 illustrate in detail one form of converter which may be employed in the arrangement of Fig. 1.
Figure 3:
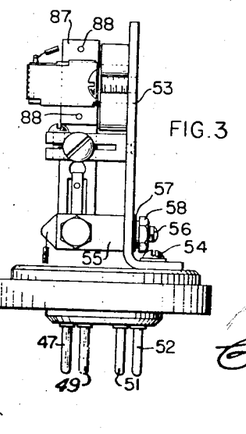

The converter 11 illustrated schematically in Fig. 1 and in greater detail in Figs. 2 and 3 operates to convert the unbalanced unidirectional currents derived from the potentiometric measuring network 2 into pulsating currents which alternately flow through first the transformer primary winding 41 and then the primary winding 42 to establish a type of square wave alternating current flow in the secondary winding 44 of the transformer 12. It will be understood that any suitable converter may be employed for this purpose but in order to illustrate an operative embodiment the converter shown in detail in Figs. 2 and 3 may be utilized.

The converter 11 illustrated in detail in Figs. 2 and 3 is of the type disclosed and claimed in application Serial No. 421,176 filed on December 1, 1941 by Frederick W. Side, which issued as Patent No. 2,423,524 on July 8, 1947. The converter 11 is provided with a base 46 in which are mounted terminals 47, 48, 49, 50, 51 and 52. A plate 53 is screwed to the base 46 by means of screws 54. A stud 55 provided with a screw threaded extension 56 is screwed to the lower end of the plate 53 by means of a lock washer 57 and a nut 58. The free end of the stud 56 is bifurcated and has spaced apart ends 59 and 60. Located between the spaced ends 59 and 60 are an insulating pad, (not shown), a spring contact arm 61 carrying a contact 62, a resilient stop 63, an insulating pad 64, a vibrating reed 65 carrying a contact 66, an insulating pad 67, a resilient stop 68, a spring contact arm 69 carrying a contact 70 and an insulating pad (not shown). These elements are all clamped between the spaced apart ends 59 and 60 by a bolt 71 and a nut 72. The spring contact arms 61 and 69 are provided with ears 73 and 74, respectively, which are electrically connected to the terminals 48 and 49, respectively. The vibrating reed 65 is provided with an ear 75 which is electrically connected to the terminal 47. Riveted to the supporting plate 53 are also studs 76 and 77 which carry adjustable stops in the form of screws 78 and 79 formed of insulating material. When the adjustable stops 78 and 79 have been adjusted as desired they are clamped in place by means of screws 80 and 81, respectively. The spring contact arm 69 carrying the contact 70 through its own resiliency engages the resilient stop 68 and the resilient stop 68 through its own resiliency engages the adjustable stop 78. In like manner, the spring contact arm 61 engages the resilient stop 63 which in turn engages the adjustable stop 79. By adjusting the adjustable stops 78 and 79, the positions of the contacts 70 and 62 may be independently adjusted with respect to the contact 66 carried by the vibrating reed 65.

A permanent magnet 82 is secured to the supporting plate 53 by screws 83 and 84. A coil 85 is held in place by a bracket 86, which in turn, is secured in place by the screws 83 and 84. The end of the vibrating reed 65 is disposed within the coil 85 and is provided with an armature 87 which is riveted to the vibrating reed 65 by rivets 88 as seen in Fig. 3.

The coil 85 is energized with alternating current and acts on the armature 87 to vibrate the reed 65 at 60 cycles per second when the alternating current supplied by the alternating current supply mains 36 and 37 is 60 cycle alternating current to cause the contact 66 to engage and disengage the contacts 70 and 62 at the same frequency. The permanent magnet 82 operates in conjunction with the coil 85 and the armature 87 in such manner as to cause the armature 87 to vibrate in synchronism with the alternating current supplied by the mains 36 and 37. By adjusting the adjustable stops 78 and 79 and hence the contacts 70 and 62, the wave form produced by the contacts 62, 66, and 70 may be adjusted to the desired value and shape. The contacts 62 and 70 are preferably so arranged that when the contact 66 is in its stationary position, it engages both contacts 70 and 62. This provides an overlapping action which compensates for wear of the contacts and also contributes somewhat to the elimination of stray electrical effects on the operation of the apparatus. Due to this overlapping action also wear of the contacts does not materially alter the wave form produced by the contacts. By mounting the contacts 62 and 70 on the spring contact arms 61 and 69, respectively, good wiping contact is at all times provided by the contact 66 and the contacts 62 and 70. An electrical connection may desirably be provided between one of the screws 54 and ground so that the various parts of the converter may be connected to ground to maintain the converter at ground potential. A cover (not shown) may also desirably be provided for enclosing the movable parts of the converter. Such a cover may be held in place on the base 46 by means of a rolled flange clamping the cover to the base. Such a cover will act to prevent dirt and corrosive atmospheres from affecting the parts of the converter.

The converter 11 is essentially a polarizing switching mechanism, the operating winding 85 and the permanent magnet 82 cooperating to vibrate the reed 65 at 60 cycles per second in synchronism with the 60 cycle alternating current supplied by the mains 36 and 37. For purposes of explanation, it may be assumed that the contact 70 is engaged by the contact 66 during a first half cycle of the alternating current supply when the voltage is positive and the second contact 62 is engaged by the contact 66 during the second half cycle when the alternating voltage supply is negative. Accordingly, the contacts 66 and 70 engage when the voltage of the alternating current supply is positive and the contacts 66 and 62 engage when the voltage of the alternating current supply is negative. When the vibrating reed 65 is stationary in its mid-position both contacts 62 and 70 will be engaged by the contact 66 so that when the vibrating reed is operated the contact 66 is always in engagement with one or the other of the contact 62 and 70.

As shown in Fig. 1, the contact 62 of the converter 11 is connected by a conductor 89 to the terminal of the transformer primary winding 41 which is remote from the primary winding 42. Similarly, the contact 70 is connected by a conductor 90 to the terminal of the primary winding 42 which is remote from the primary winding 41. As the vibrating reed 65 vibrates, therefore, the transformer primary windings 41 and 42 will alternately be connected in a series circuit which may be traced from one terminal of the thermocouple 3 through conductor 4, one or the other of the transformer primary windings 41 and 42, the vibrating reed 65 to the potentiometric network point 91, contact 9 of the potentiometric network slidewire assembly, collector bar 8 and conductor 5 back to the other terminal of the thermocouple 3. For convenience, the point of engagement of contact 9 and the slidewire resistance 7 has been designated by the reference numeral 92.

With the arrangement described, the flow and direction of current flow through the circuit branch from the potentiometric network point 91 to the converter 11, the transformer 12 and the thermocouple 3 to the potentiometric network point 92 depends upon the relation between the electromotive force produced by the thermocouple 3 and the potential difference between the potentiometric network points 91 and 92. The thermocouple 3 is so connected to the potentiometric circuit that the electromotive force of the thermocouple 3 opposes the potential difference between the potentiometric network points 91 and 92. The potential difference between the potentiometric network points 91 and 92 is increased and decreased by movement of the sliding contact 9 to the right and to the left, respectively. With a suitable adjustment of the sliding contact 9, the potential difference between the potentiometric network points 91 and 92 will be made equal and opposite to the electromotive force produced by the thermocouple 3 and no current will flow through the above traced circuit including the converter 11 and the primary windings 41 and 42 of the transformer 12. On an increase in the thermocouple electromotive force above the potential difference between the potentiometric network points 91 and 92 current will flow in one direction through the converter 11 and the primary windings 41 and 42 of the transformer 12 and such current flow may then be eliminated by a suitable adjustment of the sliding contact 9 to the right. When the electromotive force of the thermocouple 3 becomes less than the potential difference between the potentiometric network points 91 and 92 the current flow through the converter 11 and the primary windings 41 and 42 of transformer 12 will be in such a direction as to be eliminated by a suitable adjustment of the sliding contact 9 to the left.

As previously noted, the sliding contact 9 is adjusted along the length of the slidewire resistance 7 and the collector bar 8 by the reversible motor 14. The motor 14 has a pair of terminals 93 and 94 which are connected in the output circuit of the motor drive stage 13 and also has a pair of terminals 95 and 96 which are connected to the alternating current supply mains 37 and 36 through the switch 40.

The motor 14 comprises a rotor 97 and two pairs of oppositely disposed field poles on one pair of which a winding 98 is wound and on the other pair of which a winding 99 is wound. Winding 98 has its terminals connected to the motor terminals 95 and 96 and is supplied with energizing current from the alternating current supply mains 36 and 37 through a condenser 100 of suitable value. Due to the action of condenser 100, the current which flows through the motor winding 98 will be in phase with the voltage of the alternating current supply mains. The winding 99 has its terminals connected to the motor terminals 93 and 94 and is supplied with energizing current from the output circuit of the motor drive stage 13. The current supplied to the winding 99 from the motor drive stage 13 either leads or lags by approximately 90° the voltage of the alternating current supply mains and establishes a field in the motor rotor 97 which is displaced 90° in one direction or the other with respect to that established therein by the winding 98. The reaction between the field set up by the winding 99 with that set up by the winding 98 establishes a rotating field in the rotor which rotates in one direction or the other depending upon whether the winding 99 is energized with current which leads or lags by approximately 90° the voltage supplied by the supply mains 36 and 37, and consequently, in accordance with the direction of unbalance of potentiometric network 2, as will become apparent as the description proceeds. The direction and duration of rotation of the motor 14 is controlled in accordance with the direction and extent of unbalance of the potentiometric measuring network 2 so that on rotation of the motor 14, the sliding contact 9 is adjusted in the proper direction to rebalance the potentiometric measuring network 2.

The alternating voltage of square wave form which is produced in the secondary winding 44 of the transformer 12 upon unbalance of the potentiometric measuring network 2 is applied to the input terminals 101 and 102 of the electronic amplifier 10. Electronic amplifier 10 may be of any suitable type capable of greatly amplifying small alternating voltages and is supplied with energizing electrical current from the high voltage secondary winding 103 of a transformer 104 having a line voltage primary winding 105 which is connected by the conductors 38 and 39 and the switch 40 to the alternating current supply mains 36 and 37. The transformer 104 also includes a low voltage secondary winding 106 and a high voltage secondary winding 107 which is provided with a center tap. Desirably, rectifying means are included in the amplifier 1 for providing the necessary unidirectional voltages for energizing the electronic tube anode circuits. By way of example, it is noted that the electronic amplifier 1 may be of the type disclosed in the aforementioned patent of Water P. Wills. Preferably, the amplifier 1 is of a type in which little or no phase shift is produced.

The amplified quantity of the voltage being amplified and appearing at the output terminals 108 and 109 of the amplifier 1 is applied to the input terminals of the electronic motor drive stage 13. The motor drive stage 13 may be exactly like the motor drive stage disclosed in the aforementioned Wills patent and includes an electronic valve 110 which is a twin type triode having a pair of triodes 111 and 112 arranged in a single envelope. Both of the triodes include anode, control electrode or grid, cathode and heater filament elements. Energizing current is supplied the heater filaments of the triodes through conductors, not shown, from the low voltage transformer secondary winding 106.

The input circuits of the triodes 111 and 112 are connected in parallel and may be traced from the cathodes of both of the triodes through a biasing resistance 113 to the output terminal 109 of the amplifier 10, and from the output terminal 108 of the amplifier through a condenser 114 to both of the control electrodes or grids of the triodes. A resistance 115 is provided to connect both of the control electrodes or grids of the triodes directly to the lower or negative terminal of resistance 113.

Anode voltage is supplied the triode 111 from the transformer secondary winding 107 through a circuit which may be traced from the left end terminal of the winding 107 to the anode of triode 111, the anode to cathode resistance of triode 111, the cathode biasing resistance 113, a conductor 116 to the input terminal 93 of the motor 14, the motor winding 99 to the input terminal 94 of the motor and to the center tap on the transformer secondary winding 107. A tuning condenser 117 of suitable value is connected across the motor input terminals 93 and 94 and thereby in parallel with the motor winding 99. Anode voltage is supplied the triode 112 through a circuit which may be traced from the right end terminal of the transformer secondary winding 107 to the anode of triode 112, the cathode thereof, resistance 113 and the parallel connected motor winding 99 and condenser 117 to the center tap on the secondary winding 107. Thus, the triodes 111 and 112 are employed to supply energizing current to the motor control winding 99 of the motor 14.

The motor 14 is preferably so constructed that the impedance of the winding 99, when the condenser 117 is connected in parallel thereto, is of the proper value to match the impedance of the anode circuits of the triodes 111 and 112 when the motor is operating in order to obtain the most efficient operation. Preferably, the motor is so constructed that it has a high ratio of inductive reactance to resistance, for example, of the order of 6 to 1 or 8 to 1 at the frequency of the energizing current supplied to it. This provides for maximum power during the running condition of the motor with the least amount of heating and also provides a low impedance path for braking purposes.

The condenser 100 connected in series with the motor winding 98 is so selected with respect to the inductance of the winding 98 as to provide a series resonant circuit having a unity power factor. By virtue of the series resonant circuit, the total impedance of the motor winding 98 is substantially equal to the resistance of the winding, and since this resistance is relatively low, a large current flow through the winding 98 is made possible. This permits the attainment of maximum power and torque from the motor 14. In addition, the current flow through the motor winding 98 is in phase with the voltage of the alternating current supply conductors 36 and 37 because of the series resonant circuit. The voltage across the motor winding 98, however, leads the supply line voltage by substantially 90° because of the inductance of the winding 98.

The condenser 117 which is connected in parallel with the motor winding 99 is so chosen as to provide a parallel resonant circuit having a unity power factor. This parallel resonant circuit presents a relatively high external impedance and a relatively low local circuit impedance. The external impedance is approximately the same as the impedance of the anode circuits of the triodes 111 and 112 and, accordingly, provides efficient operation. The internal circuit impedance approximates the actual resistance of the winding 99, and since this resistance is relatively low, the impedance of the local circuit is also relatively low.

For the first half cycle of the alternating voltage produced across the terminals of the transformer secondary winding 107, the anode of the triode 111 is rendered positive with respect to the potential of the center tap on the winding 107. During the second half cycle of that alternating voltage, the anode of the triode 112 is rendered positive with respect to the said center tap. Accordingly, the triodes 111 and 112 are arranged to conduct on alternate half cycles of the alternating current supplied by the power mains 36 and 37.

When no signal or grid bias is impressed upon the control electrodes of the triodes 111 and 112, pulsating unidirectional current of twice the frequency of the alternating voltage supplied by the power mains 36 and 37 is impressed on the motor winding 99. When thus energized the motor 14 is not urged to rotation in either direction but remains stationary. Due to the relatively high direct current component of the current then flowing through the motor winding 99, an appreciable damping effect on the rotor 97 is produced which tends to prevent rotation of the rotor. As a result, if the rotor 97 has been rotating, the damping action referred to quickly brings it to a stop. The condenser 117 in shunt to the motor winding 99 is so chosen that the condenser and motor winding then provide a resonant circuit.

When an alternating voltage in phase with or displaced 180° in phase from the voltage of the power mains 36 and 37 and having the same fundamental frequency is impressed on the control electrodes 111 and 112, the magnitude of the pulses of current flowing in the anode circuit of one triode 111 or 112 will be increased while the magnitude of the pulses of current flowing in the anode circuit of the other triode will be decreased. Accordingly, the pulses of unidirectional current supplied to the motor winding 99 during one half cycle will predominate over those supplied to the motor winding during the other half cycle. Which anode current will be increased depends upon whether the alternating voltage impressed on the control electrodes of the triodes 111 and 112 is in phase with or 180° out of phase with the voltage of the power mains 36 and 37.

Such energization of the motor winding 99 operates to introduce therein an alternating component of current of the same frequency as that supplied by the power mains 36 and 37. This alternating component of current will either lead or lag, by 90°, the alternating current flowing through the motor winding 98 depending upon which of the triodes 111 and 112 has its anode current increased by the prevailing alternating voltage impressed upon the input circuits of triodes 111 and 112, and with either phase relation, the two currents produce a magnetic field in the motor core structure which rotates in one direction or the other depending upon said phase relation and actuates the rotor 97 for rotation in a corresponding direction. Moreover, when the motor winding 99 is so energized, the direct current component of current flowing in that winding is decreased with the result that the rotor damping effect is reduced.

In accordance with the present invention, the selective energization of the reversible electrical motor for rotation in one direction or the other is controlled by the third harmonic frequency component of the fundamental frequency of the alternating voltage supplied by the power mains 36 and 37 instead of by the fundamental frequency component. The motor energization is so controlled in order to eliminate the possibility of false balance points of the potentiometric measuring network 2, and also to eliminate erratic and unstable operation of the apparatus due to the introduction of interfering alternating currents into the potentiometric measuring circuit 2 or into the input circuit of the electronic amplifier 10 from stray alternating fields or other extraneous alternating current sources which may be present in the vicinity of the measuring apparatus. A particularly troublesome source of such stray interfering currents is the power mains 36 and 37 which supply frequency components having the same fundamental and harmonic frequencies as the controlling alternating voltage derived in the transformer secondary winding 44 from the unbalanced currents of the potentiometric measuring network 2. In order to eliminate or minimize the objectionable effects of such stray interfering currents, a filter network 118 is provided for attenuating all of the frequency components of the alternating voltage being amplified except the third harmonic frequency component. Hence, only the third harmonic frequency components appear at the output terminals 108 and 109 of the amplifier 10 and are impressed on the input circuits of the triodes 111 and 112 of the motor drive stage. A detailed description of the filter network 118 and its operation is given hereinafter.

Figure 4:
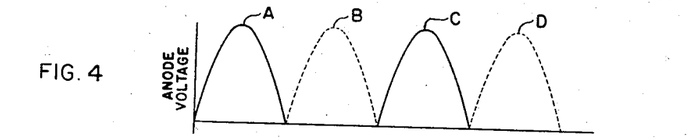
Figs. 4 through 10 show a number of curves illustrating the operation of the arrangement of Fig. 1.
Figure 5:
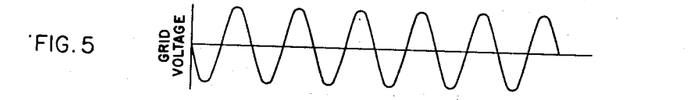
Figure 6:
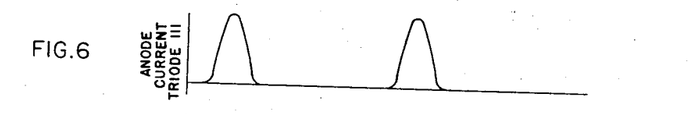

The manner in which the motor drive stage 13 responds to reversal in phase of the third harmonic frequency components which appear at the output terminals 108 and 109 of electronic amplifier 10 to selectively energize the reversible electrical motor 14 for rotation in one direction or the other will now be described by reference to the curves shown in Figs. 4 through 10. In Fig. 4, the solid curve A represents the positive half cycles of voltage impressed on the anode circuit of the triode 111 from the left hand section of the transformer secondary winding 107, and the dotted curve B represents the positive half cycles of the voltage impressed on the anode circuit of the triode 112 from the right hand section of the transformer secondary winding 107. Fig. 5 shows the third harmonic frequency component which is impressed upon the control electrodes or grids of the triodes 111 and 112 in parallel when the potentiometric measuring network 2 is unbalanced in one direction. Fig. 8 shows the third harmonic frequency component which is impressed on the control electrodes of the triodes 111 and 112 when the potentiometric measuring network 2 is unbalanced in the opposite direction. Fig. 6 illustrates the anode current flow through the triode 111 during the first half cycle of the supply voltage when the anode of triode 111 is positive and the anode of triode 112 is negative and the third harmonic frequency component of Fig. 5 is impressed upon the control electrodes of triodes 111 and 112. It will be noted that this current pulse reaches a maximum when the anode voltage impressed on the triode 111 reaches a maximum value. The anode current flow, moreover, persists only for a fraction of the complete half cycle inasmuch as the third harmonic frequency component of voltage impressed on the control electrode of triode 111 swings the said control electrode negative with respect to the associated cathode during the first and last portions of the half cycle. Since the third harmonic frequency component tends to drive the control electrode of triode 111 in the positive direction during the time when the anode voltage on the triode 111 is at a maximum value, a relatively large amplitude pulse of current then tends to flow in that anode circuit. It should be noted that the transconductance of the triode varies with the anode voltage and is a maximum value during that portion of the half cycle when the voltage impressed on the control electrode, as seen in Fig. 5, is a maximum.

During the next half cycle when the anode of triode 112 becomes positive, the third harmonic frequency component permits the flow of anode current during the first and last portions of the cycle when the anode voltage is small, but prevents the flow of anode current when the anode voltage is at its maximum value. Accordingly, during this half cycle, two small pulses of anode current, one at the beginning and the other at the end of the half cycle, will be conducted by the triode 112.

Figure 7:
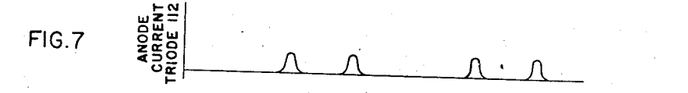
Figure 8:
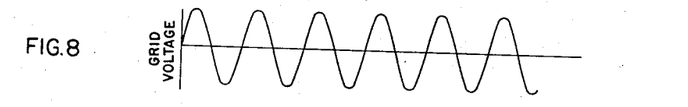

With this condition of unbalance, therefore, a series of relatively large current pulses symmetrical about the center of the half cycles A of the anode voltage and as shown in Fig. 6 will be conducted by triode 111, and during the intervals in which triode 111 is non-conductive, a series of smaller current pulses, one at the beginning and the other at the end of the half cycle B, as seen in Fig. 7, will be conducted by the triode 112. The pulses of current conducted by triode 112 are much smaller than the pulses conducted by triode 111 because as the voltage on the anode of triode 112 and the transconductance of this triode assume reasonably large values, the third harmonic component derived from the control voltage and shown in Fig. 5 and impressed on the control electrodes decreases, becomes zero, and cuts off the conduction entirely. Accordingly, the pulses of current supplied to the motor winding 99 by the triode 111 during the half cycle A for the condition of unbalance considered will be considerably greater than those supplied to the winding 99 during the second half cycle B. Such energization of motor winding 99 produces a magnetic field in the motor core structure which rotates in one direction and actuates the rotor 97 for rotation in a corresponding direction.

Figure 9:
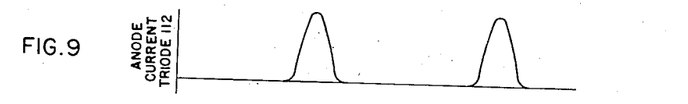
Figure 10:
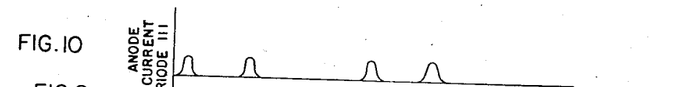

When the potentiometric measuring network 2 is unbalanced in the opposite direction, the third harmonic component derived from the control voltage reverses in phase as seen in Fig. 8 and causes a pulse of current to be supplied to the motor winding 99 by the triode 112 during the second half cycle B which predominates over two smaller pulses of current supplied to the winding 99 from the triode 111 during the first half cycle A, as may be seen by reference to Figs. 9 and 10. Such energization of motor winding 99 effects actuation of rotor 97 for rotation in the opposite direction.

The filter network 118 which is employed in Fig. 1 for attenuating all of the frequency components appearing at the output terminals 108 and 109 of the electronic amplifier 10 except the third harmonic component of the controlling voltage comprises a so-called parallel-T network which is made up of two T networks connected in parallel. This filter network is provided with input terminals 119 and 120 and output terminals 121 and 122, and includes adjustable resistances 123, 124 and 125 and capacitances 126, 127 and 128. The resistances 124 and 125 and the condenser 128 form one T network, and the condensers 126 and 127 and the resistance 123 comprise the other T network. The input terminals 119 and 120 are connected to the amplifier output terminals 108 and 109 through the condenser 114, and the output terminals 121 and 122 are connected to the amplifier input terminals 101 and 102. The resistances 123, 124 and 125 are ganged together for operation by a single control, and may be operated by means of the manipulation of a knob 129 to adjust the frequency or range of frequencies at which the attentuation is maximum.

Figure 11:
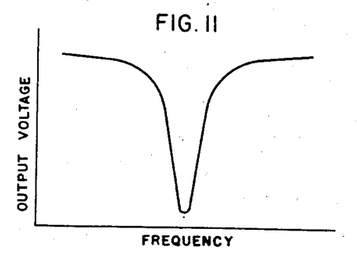
Fig. 11 is a curve illustrating the response of the frequency selective network of Fig. 1.

The response curve of the filter network 118, which has substantially zero transmission at a single frequency, the third harmonic component in the embodiment of my invention disclosed, is illustrated in Fig. 11. This response characteristic is obtained with a filter network utilizing only resistances and capacitances, but it will be understood that the same response characteristic may be obtained by other and different types of networks including combinations of resistance, capacitance, and inductance, or mechanical, piezo-electric or magneto-striction devices.

According to the present invention the filter network 118 is so designed and adjusted that the network provides maximum attenuation or substantially zero transmission at the frequency of the third harmonic component of the control voltage produced in the transformer secondary winding 44 and also of the energizing current supplied by the power mains 36 and 37. In addition, the network is so connected between the output terminals 108 and 109 of the amplifier 10 and the input terminals 101 and 102 as to feed energy from the output circuit of the amplifier to the input circuit thereof in opposition to the voltage impressed on the input terminals 101 and 102. It will be understood that, if desired, a suitable electronic amplifier may be inserted between the output terminals 121 and 122 of the network 118 and the input terminals 101 and 102 of the amplifier 10 to increase the effectiveness of the network 118 in cancelling out all the frequency components except the third harmonic component. With this arrangement, therefore, the net voltage impressed on the input circuit of the electronic amplifier 10 is constituted of the voltage derived from the transformer secondary winding 44 and the voltage applied from the output terminals 121 and 122 of the filter network 118.

Figure 12:
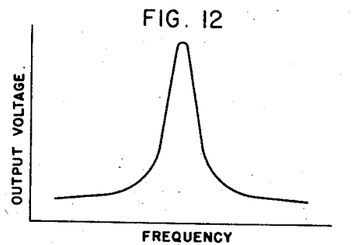
Fig. 12 is a curve similar to that of Fig. 11 illustrating the combined response of the electronic amplifier and frequency selective network of Fig. 1.

When the filter network 118 is so connected to the electronic amplifier 10, the latter effectively amplifies only a single frequency, namely that of the third harmonic of the control voltage, and all other frequencies are attenuated or eliminated so as to yield a response curve of the character illustrated in Fig. 12. The filter network 118 provides a certain amount of transmission at the said other frequencies which the electronic amplifier would normally pass and amplify and the voltage obtained at the output terminals 121 and 122 is fed back to the input terminals 101 and 102 of the amplifier 10 so that all of the frequency components have a phase difference of approximately 180° with respect to the voltage applied to the amplifier input terminals from the transformer secondary winding 44. As a result, the voltage obtained from the network 118 tends to cancel out the voltages of the same frequency applied to the amplifier input terminals, thereby reducing the gain of the amplifier 10 with respect to those frequency components, or if the feedback is sufficiently great making the attenuation substantially 100%. At the frequency or the frequencies where the network 118 provides zero or very low transmission or coupling, the net effective gain of the amplifier is at or near its maximum. The result is that the transmission characteristic of the combination comprising the amplifier 10 and the filter network 118 has a general characteristic as shown in Fig. 12.

Figure 13:
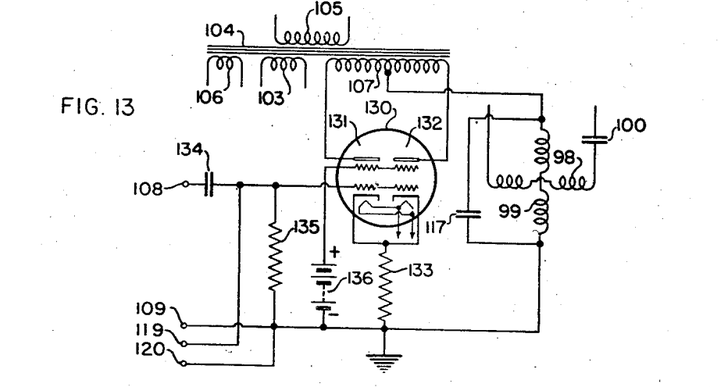
Fig. 13 illustrates a modification of the arrangement of Fig. 1.

In Fig. 13 I have illustrated, more or less diagrammatically, a modification of the embodiment of my invention shown in Fig. 1 which incorporates suitable provisions to reduce the magnitude of the smaller of the pulses conducted by one of the electronic valves of the motor drive stage upon unbalance of the potentiometric network 2 to thereby increase the torque produced by motor 14, or if desired, to effect a reversal of the smaller of the said current pulses to the end that these smaller pulses of current may actually be made to aid the larger pulses of current conducted by the other valve in energizing the motor 14 for rotation rather than detracting from such energization as in the arrangement of Fig. 1. Hence, with this modified embodiment of my invention a considerable increase in the torque produced by motor 14 may be obtained.

In the modification of Fig. 13 a tube 130 which may include two identical tetrodes 131 and 132 within the same envelope is employed in lieu of the twin triode tube 110 of Fig. 1. The tetrodes 131 and 132, if desired, may be contained within separate envelopes. It is noted also that the tetrodes 131 and 132 may each comprise any suitable pentode connected as a tetrode. Each of the tetrodes 131 and 132, as shown in Fig. 13, is provided with anode, screen, control electrode or grid, cathode and heater filament elements. Energizing current is supplied to the heater filaments of the tetrodes 131 and 132 through conductors, not shown, from the low voltage transformer secondary winding 106.

The input circuits of the tetrodes 131 and 132 are connected in parallel with each other, as are the input circuits of the triodes 111 and 112 of Fig. 1, and may be traced from the cathodes of both of the tetrodes through a biasing resistance 133 to the output terminal 109 of the electronic amplifier 10, and from the output terminal 108 of the amplifier through a condenser 134 to both of the control grids of the tetrodes. A resistance 135 is connected between the said control grids and the negative terminal of the biasing resistance 133.

A positive unidirectional potential of suitable magnitude is impressed on both of the screen grids by a battery 136 the positive terminal of which is directly connected to the screen grids and the negative terminal of which is connected to the lower and negative terminal of the biasing resistance 133. The magnitude of the unidirectional potential impressed on the screen grids by battery 136 is chosen in a manner described hereinafter.

Anode voltage is supplied the tetrodes 131 and 132 from the transformer secondary winding 107 through parallel circuits which are similar to those by means of which anode voltage is supplied to the triodes 111 and 112 of Fig. 1 and include in a common branch the motor control winding 99 and the parallel connected tuning condenser 117. Thus, the anode circuits of the tetrodes 131 and 132 are employed to supply energizing current to the motor control winding 99.

Figure 14:
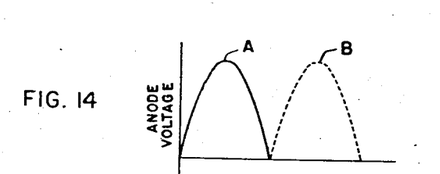
Figs. 14, 15 and 16 show curves illustrating the operation of the modification of Fig. 13.
Figure 15:
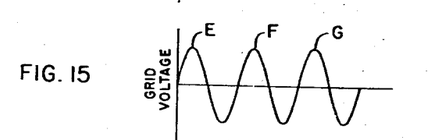
Figure 16:
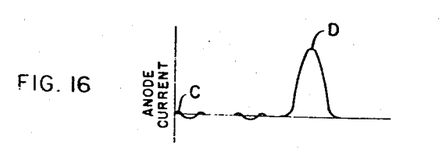

The operation of this modification of my invention and the manner in which the magnitude of the screen grid voltage is chosen will now be explained by reference to Figs. 14, 15 and 16 which show the positive half cycles of the anode voltage, the control grid voltage, and the anode current values for the tetrodes 131 and 132. In Fig. 14 the solid curve A represents the voltage impressed on the anode circuit of tetrode 131 from the left end section of the transformer secondary winding 107, and the dotted curve B represents the voltage impressed on the anode circuit of tetrode 132 from the right end section of the transformer secondary winding 107. Fig. 15 illustrates the amplified quantity of the third harmonic frequency component of the alternating voltage which is impressed on the input terminals 101 and 102 of the electronic amplifier 10 when the potentiometric network 2 is unbalanced in one direction. Upon unbalance of the potentiometric network 2 in the opposite direction the phase of this third harmonic frequency component will be exactly reversed. Fig. 16 shows the anode current flows through the tetrodes 131 and 132 when the third harmonic frequency component of Fig. 15 is impressed on the control grids. Specifically, the curve C of Fig. 16 represents the current flow in the anode circuit of tetrode 131, and the curve D represents the current flow in the anode circuit of the tetrode 132.

Two modes of operation of the modification of my invention shown in Fig. 13 are contemplated. According to the first mode of operation, the circuit constants are so chosen that the peaks E and F of the curve shown in Fig. 15 will produce as little anode current flow as possible in the output circuit of the tetrode 131 while the peak G will produce as much anode current flow as possible in the output circuit of tetrode 132. For the ideal condition when this mode of operation is employed the peaks E and F will produce no current flow whatever in the anode circuit of tetrode 131.

According to the second mode of operation, the circuit constants are so chosen that the peaks E and F will produce as much current flow as possible in the anode circuit of tetrode 131, but in the opposite direction from that in which current ordinarily flows in the anode circuit of an electronic valve, the peak G also producing as much current flow as possible, in the usual direction, in the anode circuit of tetrode 132.

The attainment of both modes of operation is accomplished by employing the tetrodes 131 and 132, the screen voltage of which is adjusted to a value slightly higher than the anode voltage value which corresponds to the grid voltage peaks E and F. This value of anode voltage, as may be seen by reference to Figs. 14 and 15, is approximately one-half the peak value of the anode voltage.

In this manner advantage may be taken of the characteristic of a tetrode that very small anode current flows for small anode voltages, when the anode voltage is less than the screen voltage, and in addition, that the anode current will reverse its direction of flow for increasing anode voltages from a value somewhat less than the screen voltage to a value somewhat higher than the screen voltage.

Whether a very small anode current flow in the usual direction is obtained or whether an actual reversal in the direction of anode current flow occurs depends upon the characteristics of the tetrodes, and in particular, upon the velocity with which electrons arrive at the anode and the secondary emission properties of the latter. Consequently, the higher the anode voltage on the tetrode 131 is for the grid voltage peaks E and F, being lower than the screen voltage, however, the smaller the current flow in the anode circuit of tetrode 131 will be and the greater the chance for a reversal in anode current. Thus, the operation of the motor drive stage according to either of the modes of operation contemplated may be accomplished by proper choice of the tetrode characteristics together with a proper choice of the anode and screen voltages.

As those skilled in the art will recognize by referring to Fig. 16, a reversal in the direction of current pulses in the anode circuit of tetrode 131 at the grid voltage peaks E and F is very desirable because they actually aid the current pulses D in the anode circuit of tetrode 132 in actuating the motor to rotation.

While the operation of this modification of my invention has been described only in connection with the operating conditions encountered when the potentiometric network 2 is unbalanced in the direction to derive a third harmonic frequency component of the phase shown in Fig. 15 for controlling the control grid potentials of the tetrodes 131 and 132, it will be understood that unbalance of the potentiometric network in the opposite direction and the production of a third harmonic frequency component of exactly the opposite phase for controlling the control grid potentials of the tetrodes 131 and 132 will cause current pulses of the character shown by curve D in Fig. 16 to flow in the anode circuit of tetrode 131 and current pulses as shown by curve C to flow in the anode circuit of tetrode 132 when operation is according to the second mentioned mode contemplated. Or the current pulses in the anode circuit of tetrode 132 may be maintained at a very small value and not flow in the reverse direction when operation is according to the first mentioned mode contemplated. Regardless of which mode of operation is employed, however, the motor 14 under this reverse condition of unbalance will be energized for rotation in the opposite direction from that in which it is actuated for the direction of unbalance first considered.

When the potentiometer network 2 is balanced, the voltage impressed on the control grids of the tetrodes from the output circuit of the amplifier 10 will be zero and the tetrodes 131 and 132 will be equally conductive. Hence, the motor 14 will not be actuated for rotation in either direction and will remain stationary.

It will be apparent that the unidirectional potential for energizing the screen electrodes of the tetrodes 131 and 132 need not be derived from a battery 136, as shown, in Fig. 13, but may, if desired, be derived from the alternating current supply conductors 36 and 37 shown in Fig. 1 by means of suitable rectifier means. Half wave rectifier means or full wave rectifier means of known type may be utilized, as desired.

Figure 17:
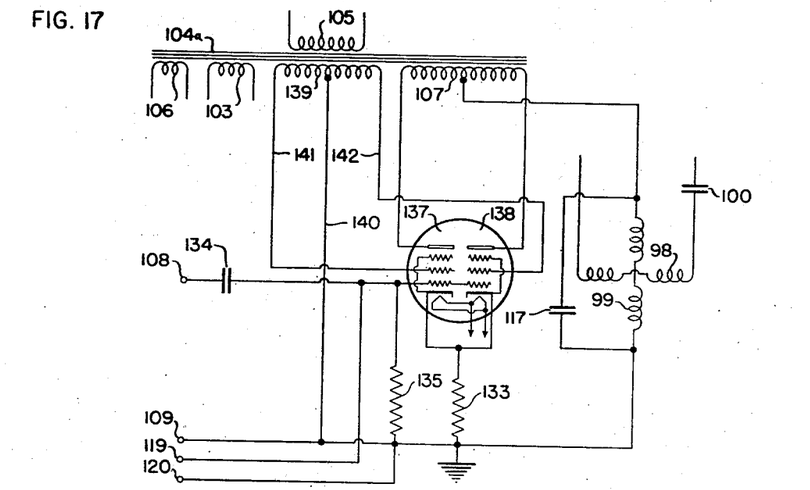
Figs. 17 and 18 illustrate further modifications of the arrangement of Fig. 1.

It will be understood that the screen electrodes need not necessarily be energized by a unidirectional potential, and that, if desired, a source of alternating potential may be utilized for this purpose, for example, in the manner illustrated in Fig. 17 wherein the motor drive stage includes two identical pentodes 137 and 138, which may be contained in separate envelopes or in the same envelope, as shown, and each of which is provided with anode, suppressor, screen, control grid, cathode and heater filament elements. Energizing current is supplied through conductors, not shown, to the heater filaments of the pentodes from the low voltage winding 106 of a transformer 104a which corresponds generally to the transformer 104 of Figs. 1 and 13 but differs therefrom in that it includes an additional center tapped secondary winding which is designated by the reference character 139.

The input circuits of the pentodes 137 and 138 have been shown as being identical to those of the tetrodes 131 and 132 of Fig. 13, and hence, need no further description.

Anode voltage is supplied the pentodes from the transformer secondary winding 107 through parallel circuits similar to those employed to provide the tetrodes of Fig. 13 with anode voltage and which include the motor control winding in a common branch.

Energizing voltage is supplied to the screen elements of each pentode from the opposite halves of the transformer secondary winding 139 in phase with the voltage impressed on the associated anode. To this end the center tap on winding 139 is connected by a conductor 140 to the lower end of the cathode biasing resistance 133 and therethrough to the cathodes of the pentodes, which as shown, are connected together, and its opposite ends are connected by conductors 141 and 142 to an individual one of the screen elements. In addition, the winding 139 is so wound on the transformer 104a that the screen element of each pentode is driven positive during the same half cycle that the associated anode is driven positive.

The improved operation of this modification of my invention, as well as that of Fig. 13, is obtained by virtue of the fact that the screen elements have a controlling influence over the anode currents. By way of example, when the pentodes 137 and 138 are of the 6AC7 type and sinusoidal voltage of 100 volts peak is impressed on the screen elements from the transformer secondary winding 139, the screen voltage at the peaks E and F of the grid voltage curve shown in Fig. 15 is approximately 50 volts. With this potential of 50 volts on the screen, the anode current is approximately 8 milliamperes when the potentials of the control grids is zero. With the peak value of 100 volts on the screen elements, the anode current is approximately 20 milliamperes under the same condition of control grid voltage. Hence, the useful anode current peaks for producing motor rotation are about two and a half times greater than the undesired ones.

Figure 18:
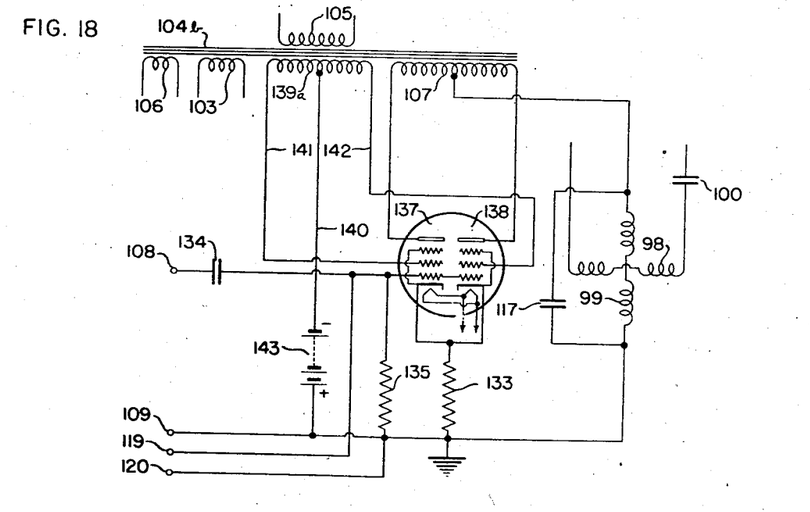

In Fig. 18 I have illustrated a modification of the arrangement shown in Fig. 17 in which the screen elements are energized with alternating potential and which may be employed to advantage in further improving the ratio of useful anode current pulses to the undesired anode current pulses. This improved operation is obtained by negatively biasing the screen elements so that the screen voltage is very low during the occurrence of the control grid voltage peaks E and F as seen in Fig. 15.

To this end alternating voltage is supplied the screen elements of the pentodes 137 and 138 from the secondary winding 139a of a transformer 104b which may be identical to the transformer 104a of Fig. 17 except in regard to the secondary winding 139a which is arranged to supply approximately twice the voltage supplied by the winding 139, and a negative unidirectional bias voltage is impressed on the said screen elements by a battery 143 which is inserted in the conductor 140.

With this arrangement, on the assumption that the peak value of the alternating potential impressed on the screen elements is 200 volts and the negative unidirectional bias voltage impressed on the screen elements by battery 143 is 100 volts, the anode current flow at the control grid voltage peaks E and F of Fig. 15, is substantially zero, while the anode current flow at the control grid voltage peak G is approximately 20 milliamperes, thus providing a material improvement in the ratio of the useful to the undesired current pulses supplied to the motor control winding 99.

While in accordance with the provisions of the statutes, I have illustrated and described the best forms of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The method of measuring a direct-current electrical quantity to eliminate the effects of stray fluctuating electrical currents superimposed thereon which tend to disturb the measurement comprising the steps of translating said direct-current electrical quantity only into a fluctuating current having a pronounced harmonic frequency component which is different from the fundamental frequency component of said stray currents, and applying said derived fluctuating current to a measuring device which is responsive only to currents of substantially the same frequency as said harmonic frequency component.

2. The method of measuring a direct-current electrical quantity to eliminate the effects of stray electrical currents of predetermined frequency which tend to disturb the measurement comprising the steps of translating said direct-current electrical quantity into a fluctuating current having a fundamental frequency substantially the same as that of said stray electrical currents and having a pronounced third harmonic frequency component, and applying said derived fluctuating current to a measuring device which is responsive only to currents of substantially the same frequency as said third harmonic frequency component.

3. The method of measuring an unknown electrical current including a unidirectional component the magnitude of which it is desired to measure and a fluctuating component of extraneous origin it is desired to eliminate comprising the steps of translating said unidirectional component only into a fluctuating current having a pronounced harmonic frequency component which is different from the fundamental frequency component of said fluctuating component of extraneous origin, and applying said derived fluctuating current to a measuring device which is responsive only to currents of substantially the same frequency as said harmonic frequency component.

4. The method of measuring an unknown electrical current including a unidirectional component the magnitude of which it is desired to measure and a fluctuating component of extraneous origin it is desired to eliminate comprising the steps of alternately applying said unknown electrical current to the opposite halves of the primary winding of a transformer having a secondary winding to establish a fluctuating current component in said secondary winding corresponding to said unidirectional component and having a pronounced harmonic frequency component which is different from the fundamental frequency component of said stray component and also to establish in said secondary winding a second fluctuating current component corresponding to said fluctuating current component of extraneous origin, amplifying both of said fluctuating current components established in said transformer secondary winding, distinguishing between the amplified fluctuating components of different frequency and feeding back all of the frequency components except said harmonic frequency component in degenerative manner to substantially cancel out all of the frequency components except said harmonic frequency component, and utilizing the amplified quantity of said harmonic frequency component to actuate an indicating device.

5. The method of selectively controlling the direction of rotation of a reversible electrical motor in accordance with the polarity of a direct-current electrical quantity to eliminate the effects of stray fluctuating electrical currents superimposed upon said direct-current electrical quantity and which tend to disturb the operation of said motor comprising the steps of translating said direct-current electrical quantity into a fluctuating current having a pronounced harmonic frequency component which is different from the fundamental frequency component of said stray currents and is of one phase or of opposite phase depending upon the polarity of said direct-current electrical quantity, and controlling the energization of said motor for rotation in one direction or the other in accordance with the phase of said harmonic frequency component.

6. The method of selectively controlling the direction of rotation of a reversible electrical motor in accordance with the polarity of a direct-current electrical quantity to eliminate the effects of stray fluctuating electrical currents superimposed upon said direct-current electrical quantity and which tend to disturb the operation of said motor comprising the steps of alternately applying said direct-current electrical quantity to the opposite halves of the primary winding of a transformer having a secondary winding to establish a fluctuating current component in said secondary winding corresponding to said direct-current electrical quantity and having a pronounced harmonic frequency component which is different from the fundamental frequency component of said stray currents and is of one phase or opposite phase depending upon the polarity of said direct-current electrical quantity and also to establish in said secondary winding a second fluctuating current component corresponding to said stray currents, amplifying both of said fluctuating current components established in said transformer secondary winding, distinguishing between the amplified fluctuating components of different frequency and feeding back all of the frequency components except said harmonic frequency component in degenerative manner to substantially cancel out all of the frequency components except said harmonic frequency component, and controlling the energization of said motor for rotation in one direction or the other in accordance with the phase of said harmonic frequency component.

7. Apparatus for measuring a direct-current electrical quantity and operative to eliminate the effects of stray fluctuating electrical currents superimposed thereon which tend to disturb the measurement including means to translate said direct-current electrical quantity only into a fluctuating current having a pronounced harmonic frequency component which is different from the fundamental frequency component of said stray currents, a measuring device which is responsive only to currents of substantially the same frequency as said harmonic frequency component, and means to apply said derived fluctuating current to said measuring device.

8. Apparatus for measuring a direct-current electrical quantity and operative to eliminate the effects of stray electrical currents of predetermined frequency which tend to disturb the measurement including means to translate said direct-current electrical quantity into a fluctuating current having a fundamental frequency substantially the same as that of said stray electrical currents and having a pronounced third harmonic frequency component, a measuring device which is responsive only to currents of substantially the same frequency as said third harmonic frequency component, and means to apply said derived fluctuating current to said measuring means.

9. Apparatus for selectively controlling the direction of rotation of a reversible electrical motor in accordance with the polarity of a direct-current electrical quantity and operative to eliminate the effects of stray fluctuating electrical currents upon the operation of said motor including means having an input circuit to which said direct-current electrical quantity is applied and having an output circuit to translate said direct-current electrical quantity into a fluctuating current in said output circuit having a pronounced harmonic frequency component which is different from the fundamental frequency component of said stray currents and is of one phase or of opposite phase depending upon the polarity of said direct-current electrical quantity, and phase responsive means connected in said output circuit and responsive only to currents of substantially the same frequency as said harmonic frequency component to control the energization of said motor.

10. Apparatus for selectively controlling the direction of rotation of a reversible electrical motor in accordance with the polarity of a direct-current electrical quantity and operative to eliminate the effects of stray electrical currents of predetermined frequency upon the operation of said motor including means having an input circuit to which said direct-current electrical quantity is applied and having an output circuit to translate said direct-current electrical quantity into a fluctuating current in said output circuit having a fundamental frequency substantially the same as that of said stray electrical currents and having a pronounced third harmonic frequency component which is of one phase or of opposite phase depending upon the polarity of said direct-current electrical quantity, and phase responsive means connected in said output circuit and responsive only to currents of substantially the same frequency as said third harmonic frequency component to control the energization of said motor.

11. Apparatus for selectively controlling the direction of rotation of a reversible electrical motor in accordance with the polarity of a direct-current electrical quantity and operative to eliminate the effects of stray electrical currents of predetermined frequency upon the operation of said motor including means to translate said direct-current electrical quantity into a fluctuating current having a frequency substantially the same as that of said stray electrical currents and having a pronounced harmonic frequency component which is of one phase or of opposite phase depending upon the polarity of said direct-current electrical quantity, an alternating current circuit including a pair of terminals adapted to be connected to a source of alternating current, a pair of grid controlled electronic devices having output circuits connected in opposite phase relation to said alternating current circuit and having a common output circuit to which said electronic devices are connected in parallel relation, means to apply said third harmonic frequency component to the control grids of said electronic devices to selectively render one of said devices more conductive than the other in accordance with the phase of said harmonic frequency component, and a reversible alternating current motor having a winding connected to said terminals and a winding connected to the output circuit of said electronic devices.

12. Apparatus for selectively controlling the direction of rotation of a reversible electrical motor in accordance with the polarity of a direct-current electrical quantity and operative to eliminate the effects of stray electrical currents of predetermined frequency upon the operation of said motor including means to translate said direct-current electrical quantity into a fluctuating current having a frequency substantially the same as that of said stray electrical currents and having a pronounced third harmonic frequency component which is of one phase or of opposite phase depending upon the polarity of said direct-current electrical quantity, an alternating current circuit having a pair of terminals adapted to be connected to a source of alternating current having the same fundamental frequency as that of said stray electrical currents, a pair of grid controlled electronic devices having output circuits connected in opposite phase relation to said alternating current circuit and having a common output circuit to which said electronic devices are connected in parallel relation, means to apply said third harmonic frequency component to the control grids of said electronic devices to selectively render one of said devices more conductive than the other accordingly as said third harmonic frequency component is of one phase or of opposite phase, and a reversible alternating current motor having a winding connected to said terminals and a winding connected to the output circuit of said electronic devices.

13. Apparatus for selectively controlling the direction of rotation of a reversible electrical motor accordingly as a controlling alternating potential having a pronounced harmonic frequency component is of one phase or of opposite phase and operative to eliminate the effects of stray alternating potentials which may be superimposed upon said controlling alternating potential including an alternating current circuit having a pair of terminals adapted to be connected to a source of alternating current having the same fundamental frequency as said controlling alternating potential, a pair of grid controlled electronic devices having output circuits connected in opposite phase relation to said alternating current circuit and having a common output circuit to which said electronic devices are connected in parallel relation, means to attenuate all of the frequency components of said controlling and stray alternating potentials except said harmonic frequency component and to apply the said harmonic frequency component to the control grids of said electronic devices to selectively render one of said devices more conductive than the other accordingly as said harmonic frequency component is of one phase or of opposite phase, and a reversible alternating current motor having a winding connected to said terminals and a winding connected to the output circuit of said electronic devices.

14. The combination of claim 13 wherein each of said grid controlled electronic devices includes anode, screen grid, control grid, and cathode elements, the anode and cathode elements of each device being connected in said alternating current circuit in such manner that a voltage of predetermined magnitude is applied to the anode of each device at the instant that the harmonic component applied to the control grid attains a peak value, and means to apply an energizing voltage of magnitude slightly greater than said predetermined magnitude to the screen grid of each device.

15. The combination of claim 13 wherein each of said grid controlled electronic devices includes anode, screen and cathode elements and the anodes are connected in said output circuits, and means to apply an alternating potential between said screen and cathode elements which is in phase with the alternating potential applied to the associated anodes from said alternating current circuit.

16. The combination of claim 13 wherein each of said grid controlled electronic devices includes anode, screen and cathode elements and the anodes are connected in said output circuits including means to apply a unidirectional potential on both of said screen elements which is negative with respect to the potential of the associated cathodes, and means to also apply an alternating potential between said screen and cathode elements which is in phase with the alternating potential applied to the associated anodes from said alternating current circuit.

17. Apparatus for selectively controlling the direction of rotation of a reversible electrical motor accordingly as a controlling alternating potential having a pronounced third harmonic frequency component is of one phase or of opposite phase and operative to eliminate the effects of stray alternating potentials having the same fundamental frequency as said controlling alternating potential and which may be superimposed upon said controlling alternating potential including an alternating current circuit having a pair of terminals adapted to be connected to a source of alternating current having the same fundamental frequency as that of said controlling potential, a pair of grid controlled electronic devices having output circuits connected in opposite phase relation to said alternating current circuit and having a common output circuit to which said electronic devices are connected in parallel relation, means to attenuate substantially all of the frequency components of said controlling and stray alternating potentials except the third harmonic frequency component and to apply the said third harmonic frequency component to the control grids of said electronic devices to selectively render one of said devices more conductive than the other accordingly as said third harmonic frequency component is of one phase or of opposite phase, and a reversible alternating current motor having a winding connected to said terminals and a winding connected to the output circuit of said electronic devices.

18. The combination of claim 17 wherein each of said grid controlled electronic devices includes anode, screen and cathode elements and the anodes are connected in said output circuits, and means to apply a unidirectional potential on both of said screen elements which is positive with respect to the potential of the associated cathode elements, the magnitude of said unidirectional potential being slightly greater than the potential impressed on the anode of the least conductive electronic device at the instant when the third harmonic frequency component impressed on the control grids of said electronic devices is a maximum positive value.

19. The combination of claim 17 wherein each of said grid controlled electronic devices includes anode, screen and cathode elements and the anodes are connected in said output circuits, and means to apply a potential on both of said screen elements which is positive with respect to the potential of the associated cathode elements, the magnitude of said potential being so related to the magnitude of the alternating potential applied to the associated anodes from said alternating current circuit that a reversal in the current flow in the output circuit of the electronic device rendered least conductive will be produced when the third harmonic frequency component impressed on the control grids of said electronic devices is near its maximum value.

20. The combination of claim 17 wherein each of said grid controlled electronic devices includes anode, screen and cathode elements and the anodes are connected in said output circuits, and means to apply an alternating potential between said screen and cathode elements which is in phase with the alternating potential applied to the associated anodes from said alternating current circuit, the magnitude of said alternating potential being so related to the magnitude of the alternating potential applied to the associated anodes from said alternating current circuit that the electronic device rendered least conductive will be rendered substantially non-conductive.

21. The combination of claim 17 wherein each of said grid controlled electronic devices includes anode, screen and cathode elements and the anodes are connected in said output circuits including means to apply a unidirectional potential on both of said screen elements which is negative with respect to the potential of the associated cathodes, and means to also apply an alternating potential between said screen and cathode elements which is in phase with the alternating potential applied to the associated anodes from said alternating current circuit, the peak value of the alternating potential applied to said screen elements being approximately twice that of said unidirectional potential and said unidirectional potential having such a value that the potential of the screen element of the least conductive electronic device is approximately the same as that of its associated cathode element when the third harmonic frequency component impressed on the control grids of said electronic devices is at its maximum positive value.

22. Apparatus for selectively controlling the direction of rotation of a reversible electrical motor accordingly as a controlling alternating potential is of one phase or of opposite phase including an alternating current circuit having a pair of terminals adapted to be connected to a source of alternating current having a fundamental frequency which is one-third that of said controlling alternating potential, a pair of grid controlled electronic devices having output circuits connected in opposite phase relation to said alternating current circuit and having a common connection to which said electronic devices are connected in parallel relation, means to apply said controlling alternating potential to the control grids of said electronic devices to render one of said devices more conductive than the other according to the phase of said controlling alternating potential, and a reversible alternating current motor having a winding connected to said terminals and a winding connected to the output circuit of said electronic devices.

23. The combination of claim 22 wherein each of said grid controlled electronic devices includes anode, screen and cathode elements and the anodes are connected in said output circuits, and means to apply a potential on each of said screen elements which is positive with respect to the potential of the associated cathode elements, the magnitude of said potential being approximately the same as the potential impressed on the anode of the least conductive electronic device at the instant when said controlling voltage is at a maximum positive value.

24. The combination of claim 22 wherein each of said grid controlled electronic devices includes anode, screen and cathode elements and the anodes are connected in said output circuits, and means to apply a potential on both of said screen elements which is positive with respect to the potential of the associated cathode elements, the magnitude of said potential being so related to the magnitude of the alternating potential applied to the associated anodes from said alternating current circuit that a reversal in the current flow in the output circuit of the electronic device rendered least conductive will be produced when the controlling alternating voltage impressed on the control grids of said electronic devices is near its maximum positive value.

25. The combination of claim 22 wherein each of said grid controlled electronic devices includes anode, screen and cathode elements and the anodes are connected in said output circuits, and means to apply an alternating potential between said screen and cathode elements which is in phase with the alternating potential applied to the associated anodes from said alternating current circuit, the magnitude of said alternating potential being so related to the magnitude of the alternating potential applied to the associated anodes from said alternating current circuit that the electronic device rendered least conductive will be rendered substantially non-conductive.

26. The combination of claim 22 wherein each of said grid controlled electronic devices includes anode, screen and cathode elements and the anodes are connected in said output circuits including means to apply a unidirectional potential on both of said screen elements which is negative with respect to the potential of the associated cathodes, and means to also apply an alternating potential between said screen and cathode elements which is in phase with the alternating potential applied to the associated anodes from said alternating current circuit, the peak value of the alternating potential applied to said screen elements being approximately twice that of said unidirectional potential and said unidirectional potential having such a value that the potential of the screen element of the least conductive electronic device is approximately the same as that of its associated cathode element when the controlling alternating voltage is at its maximum positive value.

RUDOLF F. WILD.

REFERENCES CITED

The following references are of record in the file of this patent:

UNITED STATES PATENTS

| Number | Name | Date |
|---|---|---|
| 2,053,154 | La Pierre | Sept. 1, 1936 |
| 2,150,006 | Parker et al. | Mar. 7, 1939 |
| 2,173,426 | Scott | Sept. 19, 1939 |
| 2,355,537 | Jones | Aug. 8, 1944 |
| 2,364,483 | Side | Dec. 5, 1944 |
| 2,372,062 | Dorsman | Mar. 20, 1945 |
| 2,376,527 | Wills | May 22, 1945 |